March 31, 1970   T. F. OETH ET AL   3,503,750
METHOD OF MAKING AND PRESCORING SHAPED FOOD PRODUCTS
Filed Aug. 5, 1966

Thomas F. Oeth
Leslie C. Riggs
INVENTORS

BY *Clarence A. O'Brien*
and *Harvey B. Jacobson*
Attorneys

United States Patent Office 3,503,750
Patented Mar. 31, 1970

3,503,750
METHOD OF MAKING AND PRESCORING SHAPED FOOD PRODUCTS
Thomas F. Oeth and Leslie C. Riggs, Dubuque, Iowa, assignors to Dubuque Packing Company, a corporation of Iowa
Filed Aug. 5, 1966, Ser. No. 570,613
Int. Cl. A23b 1/04
U.S. Cl. 99—1                                      7 Claims

ABSTRACT OF THE DISCLOSURE

Open-top generally imperforate containers are filled with a fluent proteinaceous substance having sufficient tackiness so as not to drop out of the container when it is inverted. The container is inverted and heated causing the proteinaceous substance to coagulate and drop downwardly onto the surface supporting the container. The entire outer surface of the formed substance can be subjected to the action of a preserving medium.

---

This invention relates generally to a method of making molded or shaped food products and more particularly to a method of making shaped food products from substances characteried by adhesive properties generally attributable to the presence of proteins of either animal or plant origin.

Heretofore, it has been conventional to form shaped food products from meat emulsions, cereal grain doughs and the like, by cooking and/or smoking such substances in generally rigid imperforate open-topped containers to denature or coagulate the protein present through the agencies of heat and/or acidulation.

It has also been known to shape a semi-soft meat emulsion or the like, without skin-forming pressure, into a flattened or cake-like configuration which is generally self-supporting when disposed on a flat perforate surface for a sufficient period of time to permit a cooking and/or smoking operation so as to alter the protein to render the article substantially rigid.

Furthermore, it is known to be conventional to cook and/or simultaneously smoke meat emulsions such as sausages, frankfurters, etc. and the like in smoke permeable casings and/or perforate containers so as to expose a maximum percentage of the exterior surface of the food product to the action of a preserving and flavoring substance such as smoke generated from smoldering hardwood.

The processing of food products of the nature described by the aforementioned methods is characteried by a number of inherent disadvantages. For example, when an emulsion or the like is cooked and/or simultaneously smoked in an open top otherwise imperforate container only the top surface of the emulsion is exposed to the smoke. Furthermore, there is little if any possibility for excessive moisture to drain away from the produce and furthermore drippings from product being smoked on racks at higher levels in some cases may drip into the open top containers beneath thus creating a highly undesirable condition.

It is therefore a primary object of the present invention to provide an improved method of making shaped food products from substances characterized by adhesive properties generally attributable to the presence of proteins be they of animal and/or plant origin.

Another object of the present invention is to provide a method whereby proteinaceous substances such as meat emulsions or mixtures, cereal grain doughs or batters and the like may be placed in molds or containers of a suitable configuration and processing carried forth in such a manner so as to expose substantially all of the surface of the product to the flavoring and bacteriostatic action of smoke, for example as well as permitting draining of excess moisture therefrom without necessitating utilization of smoke permeable casings or the like.

A further object of the present invention is to provide a novel method whereby molded or shaped food products may be produced from emulsions and the like of proteinaceous containing substances such as meat, fish, poultry, baked goods, etc. whereby open top generally imperforate containers are partially filled with a generally fluent proteinaceous substance which substance is partially uncoagulated and is characterized by sufficient tackiness to ensure that when a container partially filled with the substance is inverted the proteinaceous substance does not prematurely drop out of the container. The inverted container is then treated in such a manner so as to coagulate or denature the proteinaceous substance thereby significantly reducing its tackiness and accordingly permitting the coagulated mass to drop downwardly onto the surface supporting the inverted container thereby subjecting substantially the entire outer surface of the formed food product to the action of a preserving medium such as wood smoke, for example.

Still another object of the present invention is to provide a method of making molded or shaped food products by the aforementioned procedure whereby the surface supporting the inverted container is generally perforate so as to simultaneously permit exposure of the lower surface of the formed product to the action of a treating medium such as smoke, for example, and also facilitate marking of the food product with an embossed trademark or design the depth of which embossing may be controlled by the relative rigidity of the food composition at the time it has coagulated sufficiently so that the effect of gravity causes drop out of the generally self-sustaining product onto the supporting surface.

Still a further object of the present invention of making molded or shaped food products is to control the amount of coagulation present in the proteinaceous food substance in order to control the release of the substance from the inverted container by the combined agencies of the configuration or material of the container, as well as the nature of the proteinaceous emulsion with which the container is partially filled.

Still a further object of the present invention is to provide a simple efficient, economical method of making shaped food products and simultaneously prescoring the same with suitable designs or indicia whereby a shaped food product of maximum consumer appeal will be produced with a minimum of handling.

These together with other objects and advantages which will become subsequently apparent reside in the method of the present invention as more fully hereinafter described and claimed, reference being had to the accompanying drawings forming a part hereof, wherein like numerals refer to like parts throughout, and in which:

Figure 1:
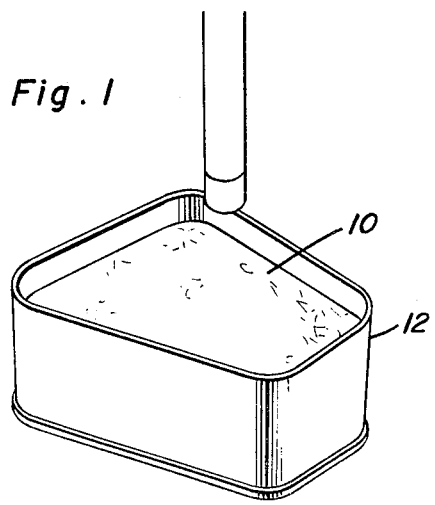
FIGURE 1 shows a suitable container partially filled with a proteinaceous substance.
Figure 2:
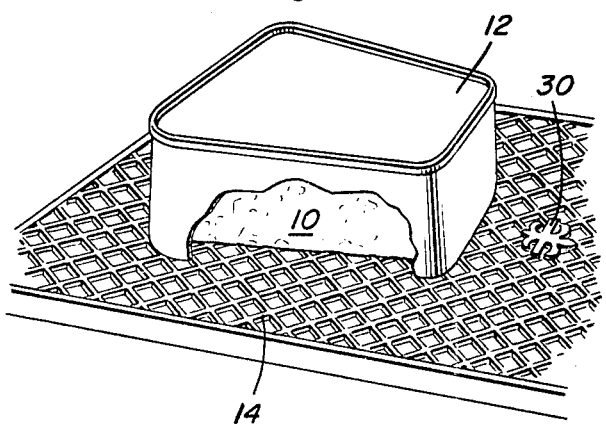
FIGURE 2 shows the partially filled container of FIGURE 1 inverted on a foraminous support.
Figure 3:
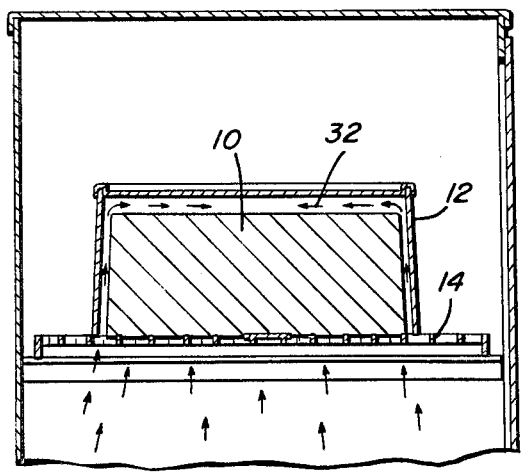
FIGURE 3 shows the support of FIGURE 1 with the container thereon placed in a suitable means adapted to coagulate the proteinaceous substance, further showing how the coagulated substance has dropped away from the container.

In the broadest sense this invention relates to a process for manufacturing molded or shaped food products, generally fluent food substances, that have adhesive properties during an initial stage of their manufacture. Furthermore, these fluent foods generally contain heat liable undenatured proteins which upon application of heat coagulate to impart a rigid structure to the food. The uncoagulated proteinaceous food substance 10 is introduced into the container 12 to somewhat below the upper edge thereof after which the container is inverted upon a suitable supporting surface such as a diamond mesh screen 14 for example prior to carrying forth the cooking and/or smoking procedure set forth hereinafter. It will be noted that one of the novel manipulative steps of this process, and one which is critical thereto, involves placing the partially filled container with its open top positioned downwardly upon the supporting screen in a position which is upside down as compared to the usual procedure proposed heretofore. The finished shape of the food product depends, of course, on the configuration of the container enclosing the emulsion during initial coagulation. The method of the present invention contemplates the processing of proteinaceous food substances in suitably shaped containers such as formed of plastic, metal, paper, glass, ceramic, etc. which are essentially devoid of any undercuts which would prevent release of the shaped product from the container.

The relative viscosity and tackiness of the proteinaceous substance and the configuration of the containers are selected so as to ensure that the proteinaceous emulsion will adhere to the bottom and sides of the container for a predetermined time when the container is inverted on the screen or the like. The distance between the upper surface of the proteinaceous emulsion in the container, which in the inverted position is of course the bottom of the mass of the proteinaceous material, and the lip of the opening of the container is predetermined as will become apparent hereinafter, to assist in determining the end result of the processing as well as the deposition of smoke, for example on all surfaces of the shaped product.

During treatment of the inverted partially filled container to coagulate the proteinaceous substance the shaped food product drops onto the supporting screen followed by carrying forth to completion the cooking cycle, smoke deposition, etc. on all surfaces of the product and in the case of a foraminous supporting screen, prescoring of the formed product.

As intimated heretofore, the method of the present invention greatly improves the consumer eye-appeal of the product such as by scoring the product with a diagonal diamond design analogous to that normally formed when scoring a whole ham during the cooking and glazing thereof. It will be understood, of course, that the container supporting screen or surface may be selectively varied to facilitate embossing the shaped food product with a design or trademark of any suitable nature such as indicated at 30. The depth of scoring or embossing of the design into the surface of the food product is somewhat dependent upon the degree of coagulation of the proteinaceous emulsion at the time of its release from the container onto the screen as well as the distance the coagulated food falls onto the screen.

From the foregoing it will be readily apparent that it is possible to deposit smoke or otherwise treat substantially all surfaces of the product since once the coagulated proteinaceous shaped food product has fallen away from the container onto the screen the smoke and/or the treating agents are free to circulate around and in contact with the exterior of the food product by virtue of the space created between the product and the container of eliminating, as indicated at 32, the need for smoke permeable liners, casings, containers, or the like. Moreover, it will be appreciated that during the cooking and smoking the container serves as a shield to prevent drippings, such as grease or food, for example, from landing on the product and detracting from its quality and appearance.

The following examples are included to specifically illustrate, and are exemplary of, the practice of the method of the present invention.

EXAMPLE I

An oval shaped, cured, smoked, ready-to-eat ham utilizing ground ham pieces was produced by the following method.

Defrosted pieces of ham were placed in a suitable meat grinder where they were comminuted and extruded through a grinder plate having apertures of 1/8 inch. The ground meat was placed in a conventional meat emulsion mixing device wherein, on the basis of weight, 2% sodium chloride and 8% water were intimately admixed with the meat. The mixing was continued for a couple of minutes after which the emulsion was transferred to a conventional meat emulsion extruding or stuffing device such as that equipped to automatically deliver a predetermined volume of emulsion. The ham emulsion was extruded under pressure of approximately 120 to 125 p.s.i. into relatively rigid containers formed of polypropylene having a configuration similar to that of metal ham containers. The meat emulsion, within the plastic containers, was adjusted by suitable means so that the upper surface of the meat was generally smooth. The containers were partially filled so that there was a head space of approximately three-eighths of an inch between the top of the proteinaceous emulsion and the top edge of the container.

Figure 4:
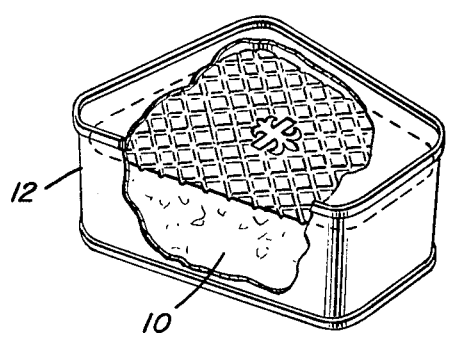
FIGURE 4 shows the shaped food product packaged in a can, which may be the can shown in FIGURES 1–3.
Figure 5:
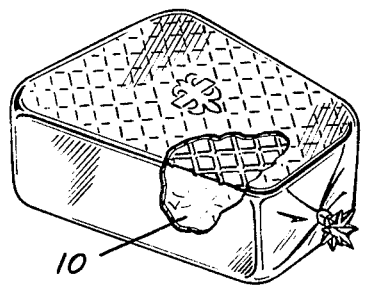
FIGURE 5 shows the shaped food product resulting from FIGURE 4 packaged in a suitable plastic film.

The partially filled containers as set forth above were then inverted and supported on a foraminous support with the open top of the container facing downwardly toward the support. The support comprised suitable metal mesh screen with diamond-shaped openings approximately 7/8 inch in length and one quarter of an inch in width. A plurality of screens containing a number of partially filled containers of ham inverted thereon were placed in a conventional hot air smokehouse set at approximately 180° F. It required approximately one-half to three-quarters of an hour for the temperature of the smokehouse to recover to 180° subsequent to the placement of the containers therein. After approximately 45 minutes longer, the ham had coagulated sufficiently so that the adhesive properties had diminished so as to permit the ham to drop out of the container onto the supporting screen under the influence of gravity. The hams remained in the smokehouse approximately an additional 3¼ hours until an internal temperature of 152° was reached by all the hams. It will be understood, of course, that the underside of the shaped food product was characterized by prescoring corresponding to the design of the supporting screen which prescoring was embossed approximately one-eighth inch deep into the surface of the ham. The shaped hams were then chilled, and packaged in a suitable manner either by replacing in the forming container provided with a lid as seen in FIGURE 4 or by wrapping in a suitable plastic film, bag or the like as seen in FIGURE 5 and then distributed for sale.

EXAMPLE II

A shaped cereal protein product was produced by mixing, on the basis of weight, 60% wheat gluten and 40% water until the gluten was thoroughly dispersed. The proteinaceous admixture was then placed in suitable containers such as utilized in Example I which partially filled containers were inverted on support screens and placed in a hot air oven controlled at a temperature of approximately 150° F. The gluten cakes coagulated sufficiently after approximately three hours for the reduction of adhesiveness and the force of gravity to cause the cakes to drop from the container onto the supporting screen. The cakes retained the shape of the container and thus while the flavor and texture of the product was poor it demonstrates the application of the method of the present invention to a shaped cereal product.

EXAMPLE III

A shaped fish protein product was produced from undenatured, defrosted filets of fish. The fish product had a composition comprising:

| | Percent |
|---|---|
| Defrosted boneless sole | 89.2 |
| Water | 9.0 |
| Salt | 1.8 |

The filet of fish was placed in a suitable grinding apparatus where it was comminuted and extruded through a grinder plate having ⅛ inch apertures. Water and salt were added in the above proportions and the composition mixed for approximately 2 minutes in a conventional commercial food mixer operating at medium speed. The proteinaceous mixture was placed in plastic containers, such as those utilized in carrying forth Example I and the partially filled containers were inverted on suitable screens and placed in a hot air oven controlled at a temperature of approximately 150° F. The fish loaf, produced from previously frozen fish filets, dropped from the containers onto the supporting screens in approximately three hours. The fish loaves were observed to have held their shape and accordingly demonstrated that the method of the present invention is applicable to the production of shaped food products from frozen, undenatured proteinaceous matter derived from fish.

EXAMPLE IV

A shaped fish protein product was produced from fresh filet of fish. The proteinaceous composition comprised:

| | Percent |
|---|---|
| Boneless fresh catfish | 89.2 |
| Water | 9.0 |
| Salt | 1.8 |

The filet of catfish was placed in a suitable food grinder and extruded through a grinder plate having ⅛ inch apertures. The water and salt were incorporated and mixed in a suitable food mixer for approximately 2 minutes at a medium speed. The fish mixture was placed in suitable plastic containers such as set forth in Example I and the partially filled containers were inverted on suitable supporting screens and placed in a hot air oven maintained at a temperature of approximately 150° F. The fish loaves dropped from the containers is approximately three hours and were observed to have a self-sustaining form and thus demonstrated that the method of the present invention is applicable to the production of shaped food products incorporating proteinaceous food substances derived from fresh fish.

EXAMPLE V

A shaped proteinaceous product was produced from precooked denatured fish protein and undenatured egg protein comprising:

| | Percent |
|---|---|
| Sterile processed canned salmon solids | 84.0 |
| Fresh undenatured whole eggs | 7.0 |
| Bread crumbs | 4.0 |
| Evaporated milk | 4.0 |
| Butter | 1.0 |
| Salt | 0.5 |

The above ingredients were combined and intimately admixed by vigorously mixing by hand for approximately three minutes. The proteinaceous mixture was placed in plastic containers such as those set forth in Example I and the partially filled containers were inverted onto a suitable supporting screen and placed in a hot air oven controlled at a temperature of approximately 150° F. The fish cakes dropped from the containers onto the supporting screen in approximately four hours. It was observed that the fish cakes produced in this manner were self-sustaining, thus demonstrating that the method of the present invention is applicable to the utilization of precooked, denatured, proteinaceous materials in connection with undenatured, uncoagulated proteinaceous substances, such as from eggs, to form shaped food products.

EXAMPLE VI

A shaped proteinaceous product was produced from undenatured proteinaceous material derived from fowl and comprised:

| | Percent |
|---|---|
| Boneless undenatured fresh chicken | 89.2 |
| Water | 9.0 |
| Salt | 1.8 |

The boneless chicken was placed in a suitable food grinder where it was comminuted and extruded through a grinder plate having ⅛ inch apertures after which the water and salt were added and the ingredients intimately admixed by mixing for approximately two minutes in a conventional food mixer operating at a medium speed. The proteinaceous chicken mixture was placed in suitable plastic containers such as those set forth in Example I and the partially filled containers inverted on support screens and placed in a hot air oven opertaing at a temperature of approximately 150° F. The chicken patties dropped from the containers in approximately five hours and were observed to hold the shape of the forming or molding container and thus demonstrate that the method of the present invention is applicable to the production of shaped food products incorporating undenatured fresh poultry products.

EXAMPLE VII

A shaped meat protein product utilizing formed shaped pork shoulder meat was produced from 100% cured, skinned, boneless pork shoulder picnics. The cured pork shoulder meat was passed through a series of knives to yield cubes of meat of approximately one inch. The pieces of meat were mixed under vacuum in a commercial meat mixer to exhaust air from the interstices and the meat was then extruded into plastic containers of the nature set forth in Example I. The partially filled containers were inverted on suitable supporting screens placed in a smokehouse controlled at a temperature of approximately 180° F. The shaped meat product dropped from the plastic container onto the supporting screen in approximately one hour thus showing the feasibility of using slices, chunks or fragments of meat in the method of the present invention to produce shaped food products.

In summary, it will be appreciated that the method of the present invention makes use of two forces that are in opposition to each other. The first force is the adhesion between the uncoagulated food and the walls of the containers enclosing the food. The second force is that of gravity which exerts a constant force tending to pull the uncoagulated food downwardly from the containers. In applying the method of this invention to the processing of proteinaceous foods, the two forces must be controlled or balanced to yield the desired results, i.e. the force of adhesion must be stronger than the force of gravity until the desired amount of coagulation of the proteins has occurred so as to preclude premature drop out of the food from the inverted container during cooking. The coagulation of the protein causes the surface of the food to become firm and maintain the form of the enclosing container. Also, the coagulation of the protein eliminates much of the tackiness of the food thus allowing the force of gravity to overcome the force of adhesion at the proper time in the cooking cycle to allow the food to drop when it has the desired rigidity. It will be understood that the food must drop to become prescored and allow dehydration and smoke deposition to act on all surfaces of the shaped food.

More specifically, the manipulation of the adhesion of the food to the enclosing container must be controlled in order to produce the desired food product. This is accomplished by controlling the types and content of the proteins within the food, the amount of proteins available to adhere to the enclosing containers, and the degree of bonding of the proteins with the container walls. Components other than proteins can also affect the adhesion between the food and the container by increasing the viscosity of the food thereby hindering the drop out of the food. Furthermore, various proteins coagulate at different temperatures and the specific proteins will thus affect the temperature at which drop out occurs. The proteins must be available at the proper concentration and condition at the interface of the food and container to yield proper adhesion. Severing muscle bundles to allow meat, fish and fowl proteins to be available at the interface of a relatively solid food rather than within the muscle is an example of how the proper conditions may be obtained. Proper dispersion of undenatured proteins such as egg proteins as in Example V is essential to produce desired results in certain food systems, thus pointing up the fact that the protein must have the proper chemical characteristics, such as state of coagulation, to bond with the container.

The container selected to be used with various food systems is important. The container must form a temporary bond with the food that is sufficiently strong to maintain the food suspended within the container until the desired amount of coagulation has occurred. Conversely, the bond between the container and the food must not be so strong that the food will not drop out. The type of materials used in the container and the conditions at the interface of the food and the container affect the bonding, and must be properly matched with the specific food in the practice of the present invention. The shape of the container is important since the amount of bonding is related to the surface area exposed for adhesion between the food and container and the weight of the food being suspended. The angle of the container walls affects the amount of friction the food encounters during drop out, and preferably when the container is in the inverted position the side walls should diverge outwardly to some degree.

The second force, gravity, exerts a constant force tending to pull the food downward from the containers. There is no easy means of counteracting this force when using the method disclosed. It would be possible to exert pressure from beneath the food with a fluid such as air for example to apply a force to hold the food in the container, thus, counteracting all or some of the force of gravity, Furthermore, it will be appreciated that in addition to the above means of regulating drop out of the food from the container elaborate systems could be devised to exert physical force, such as vacuum for example, on the food composition which force is sufficient to overcome part or all of the force of adhesion between the container and the food and thereby influence the time of drop out of the food from the container.

It will be readily apparent from the foregoing that the method of the present invention satisfies the several objects set forth hereinbefore and thus provides a simple economical means of producing shaped food products of varying compositions.

The foregoing is considered as illustrative only of the principles of the invention. Further, since numerous modifications and changes will readily occur to those skilled in the art, it is not desired to limit the invention to the exact method shown and described and accordingly all suitable modifications and equivalents may be resorted to, falling within the scope of the invention as claimed.

What is claimed as new is as follows:

1. A method of producing a shaped proteinaceous food product which comprises:

partially filling a container having at least one open side with a generally undenatured proteinaceous food composition characterized by sufficient tackiness to insure adhesion of the composition to the walls of the container when the container is inverted;

inverting the partially filled container on a suitable supporting surface;

heating the inverted partially filled container to coagulate the protein to produce a generally self-sustaining shaped product having insufficient tackiness at the interface with the walls of the container so as to permit the shaped product to drop out of the container onto the supporting surface whereby processing of the shaped product is completed by circulation of a treating agent in contact with a major portion of the surface of the shaped product previously contiguous with the walls of the container.

2. A method producing a shaped proteinaceous food product which comprises:

partially filling a generally imperforate food mold, having at least one open side, with a generally fluent generally undenatured proteinaceous tacky food composition characterized by sufficient tackiness to insure adhesion of the composition to the mold when the partially filled mold is placed with the open side facing downwardly;

inverting the partially filled mold on a foraminous support surface with the open side of the mold facing the foraminous support; and subjecting the so positioned mold partially filled with the generally undenatured proteinaceous composition to heating to render the composition generally rigid and less tacky whereby the shaped food product drops out of the mold onto the support of the surface for contacting the surfaces of the shaped food product previously contiguous with the walls of the mold with a treating medium.

3. A method of producing a shaped proteinaceous food product which comprises:

partially filling a generally imperforate container, having an open top, with a generally fluent generally undenatured proteinaceous tacky food composition characterized by sufficient tackiness to insure adhesion of the composition to the container for a predetermined length of time when the partially filled container is placed with the open top facing downwardly;

inverting the partially filled container on a foraminous support surface with the open top of the container facing the foraminous support; and subjecting the inverted partially filled container to a sufficient temperature for a sufficient length of time to render the generally fluent composition generally self-sustaining and less tacky whereby the proteinaceous composition drops from the container onto the supporting surface for circulation of a treating medium in contact with the surfaces of the shaped food product previously contiguous with the container walls.

4. The method of claim 3 wherein the treating medium is smoke generated from burning wood.

5. The method of claim 3 wherein the protein present in the food composition is derived from animals and plants.

6. The method of claim 5 wherein the protein present in the food composition is derived from animals.

7. The method of claim 5 wherein the protein present in the food composition is derived from plants.

References Cited

UNITED STATES PATENTS

| 605,120 | 6/1898 | Nathan | 99—107 |
| 2,246,804 | 6/1941 | Lipschutz | 99—229 |
| 3,068,104 | 12/1962 | Gretler et al. | 99—109 |
| 3,100,710 | 8/1963 | Carlin | 99—107 |

MAURICE W. GREENSTEIN, Primary Examiner

S. B. DAVIS, Assistant Examiner

U.S. Cl. X.R.

99—83, 108, 182, 187, 229